United States Patent

Jaynes et al.

[11] Patent Number: 5,417,935
[45] Date of Patent: May 23, 1995

[54] WHEELED SCR SEALING MECHANISM

[75] Inventors: Leslie P. Jaynes, Richardson; Kenneth D. Thomas, Dallas, both of Tex.

[73] Assignee: Peerless Manufacturing Company, Dallas, Tex.

[21] Appl. No.: 65,157

[22] Filed: May 21, 1993

[51] Int. Cl.$^6$ .................. B01D 50/00; B01J 8/04; B01J 8/08; B01J 21/04

[52] U.S. Cl. .................. 422/177; 422/179; 422/181; 422/191; 422/214; 422/221; 422/237; 422/311; 502/439

[58] Field of Search .................. 422/177–181, 422/190–191, 211, 212, 214, 221, 222, 237, 238, 239, 310, 311, 312; 220/1.5; 502/439; 414/154, 334; 312/334.18, 334.21, 334.42, 334.12

[56] References Cited

U.S. PATENT DOCUMENTS

| | | | |
|---|---|---|---|
| 2,178,460 | 9/1955 | Bowen, III | 422/179 |
| 4,238,455 | 12/1980 | Ogiwara | 422/171 |
| 4,322,231 | 3/1982 | Hilzendeger et al. | 55/304 |
| 4,322,386 | 3/1982 | Masutomi et al. | 422/171 |
| 4,323,376 | 4/1982 | Rosenquest | 55/357 |
| 4,639,145 | 1/1987 | Lautenschlager | 384/19 |
| 4,666,221 | 5/1987 | Ernst | 312/334.18 |
| 5,009,856 | 4/1991 | Fenger et al. | 422/178 |

*Primary Examiner*—Robert J. Warden
*Assistant Examiner*—Christopher Y. Kim
*Attorney, Agent, or Firm*—Richards, Medlock & Andrews

[57] ABSTRACT

An SCR reactor (50) is disclosed which permits ready removal of a catalyst bed (58) from the SCR reactor and provides an effecting sealing mechanism between the catalyst bed (58) and the frame (52) of the SCR reactor. The frame is provided with side rails (54, 56) which have individual indentations spaced therealong. The catalyst bed is provided with wheels (60A, 60B, 60C) along its length which permit the catalyst bed to be rolled along the side rails until the catalyst bed is moved into its installed position whereupon the wheels descend into the indentations (62), causing the weight of the catalyst bed to form an effective seal between a downwardly face edge (64) on the catalyst bed and the frame (52).

13 Claims, 3 Drawing Sheets

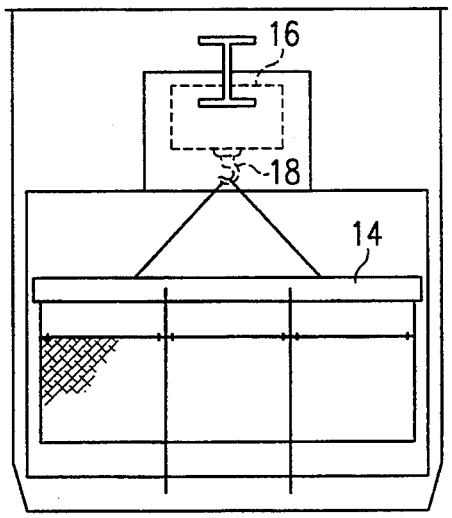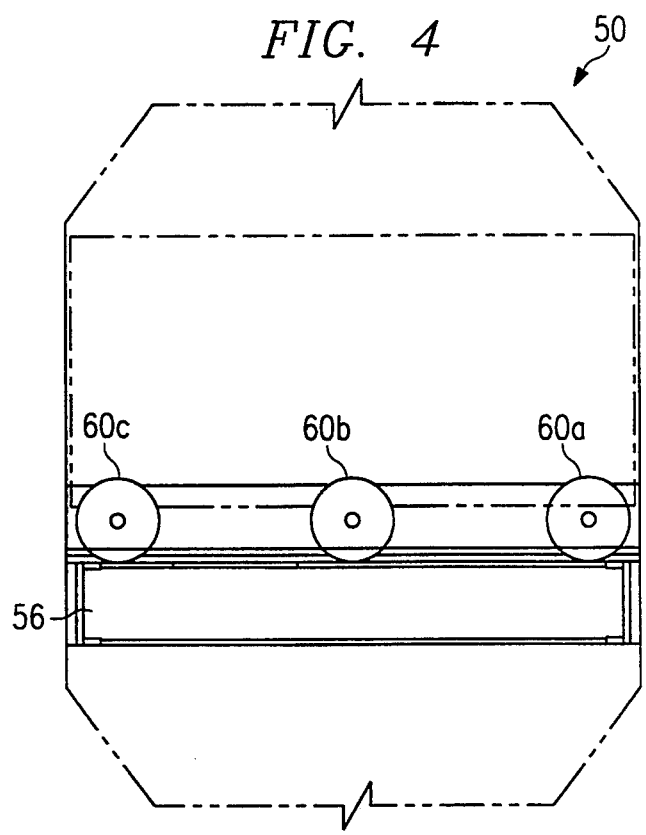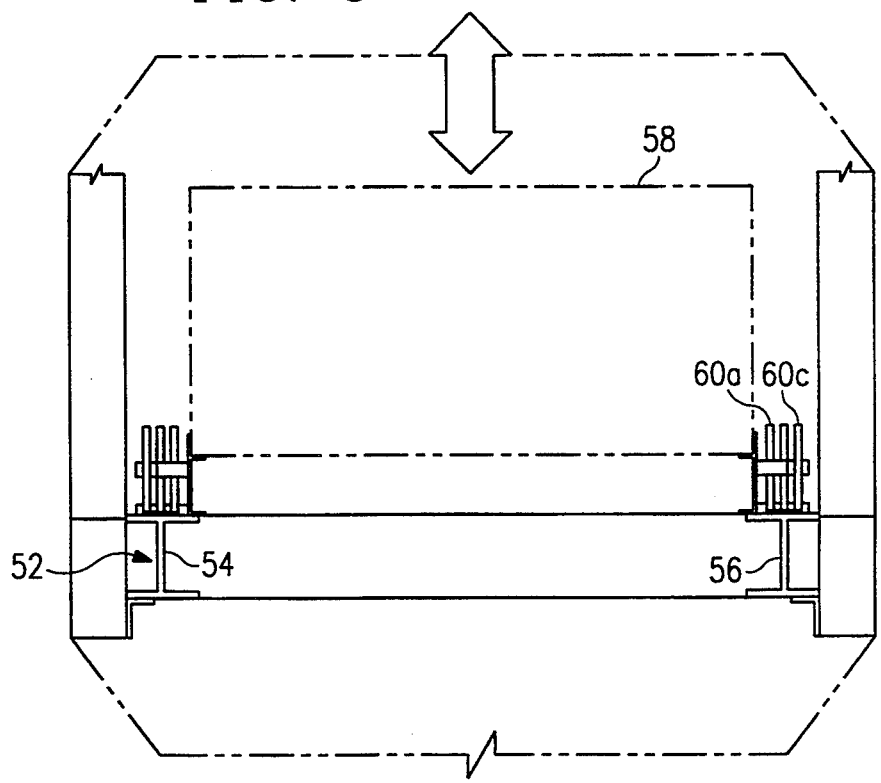

WHEELED SCR SEALING MECHANISM

TECHNICAL FIELD OF THE INVENTION

This invention relates to an improved technique for installing and removing a catalyst bed in an SCR reactor and forming an effective seal between the catalyst bed and the SCR reactor.

BACKGROUND OF THE INVENTION

SCR reactor technology is being used with increasing frequency to treat the exhaust gases from an industrial process, such as energy production, before the gas is released to the atmosphere. The SCR reactor process relies on the use of proprietary catalyst to treat the exhaust gas as the gas passes through the SCR reactor. Because the catalyst is an integral part of the chemical reaction, great effort is used to provide maximum exposure of the catalyst to the exhaust gas and to insure that all the exhaust gas comes into contact with sufficient catalyst for treatment.

The catalyst has a limited effective service life. The catalysts are typically held within catalyst beds which must be removed and replaced with beds containing new catalyst at regular intervals. Therefore, great attention must be paid to the design so that this exchange of catalyst bed can be undertaken quickly with a minimum of effort. A need exists for further advancement in this regard, while maintaining the fundamental requirement of forming an effective seal between the catalyst beds and the catalyst reactor to insure that all exhaust gas pass through the catalyst.

SUMMARY OF THE INVENTION

In accordance with one aspect of the present invention, an SCR reactor is provided for treating a gas with a catalyst. The SCR reactor includes a frame with gases to be treated passing through the frame. At least one catalyst bed is provided which has a plurality of wheels for rolling the catalyst bed along the frame between an installed position and a removal position. The catalyst bed further has a downward facing edge. The frame has indentations to receive the wheels of the catalyst bed in the installed position with the downward facing edge in sealing engagement with the frame.

In accordance with another aspect of the present invention, a plurality of catalyst beds are provided. The catalyst are stacked vertically above each other and are each individually movable between the installed and removed positions independent of the other catalyst beds.

BRIEF DESCRIPTION OF THE DRAWINGS

For a more complete understanding of the present invention and for further advantages thereof, reference is now made to the following description to the preferred embodiment, taken in conjunction with the accompanying drawings in which:

FIG. 3 is a view of the SCR reactor of FIG. 1 illustrating a catalyst bed lifted for removal;

FIG. 4 is a sectional side view of an SCR reactor forming a first embodiment of the present invention;

FIG. 5 is a front view of the SCR reactor of FIG. 4;

DETAILED DESCRIPTION

Figure 2:
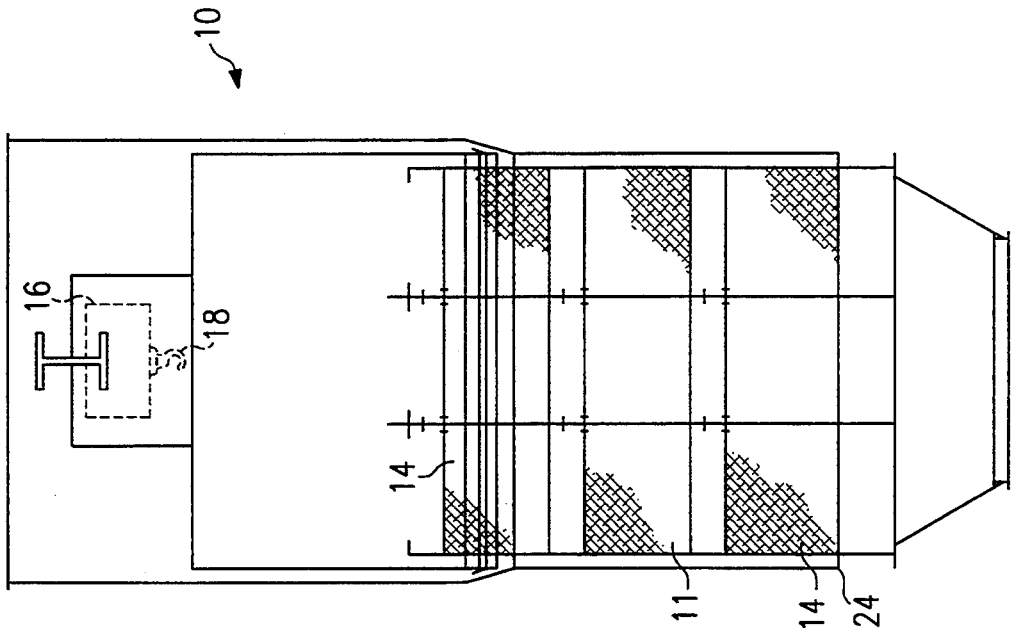
FIG. 2 is a front elevation view of the SCR reactor of FIG. 1.
Figure 1:
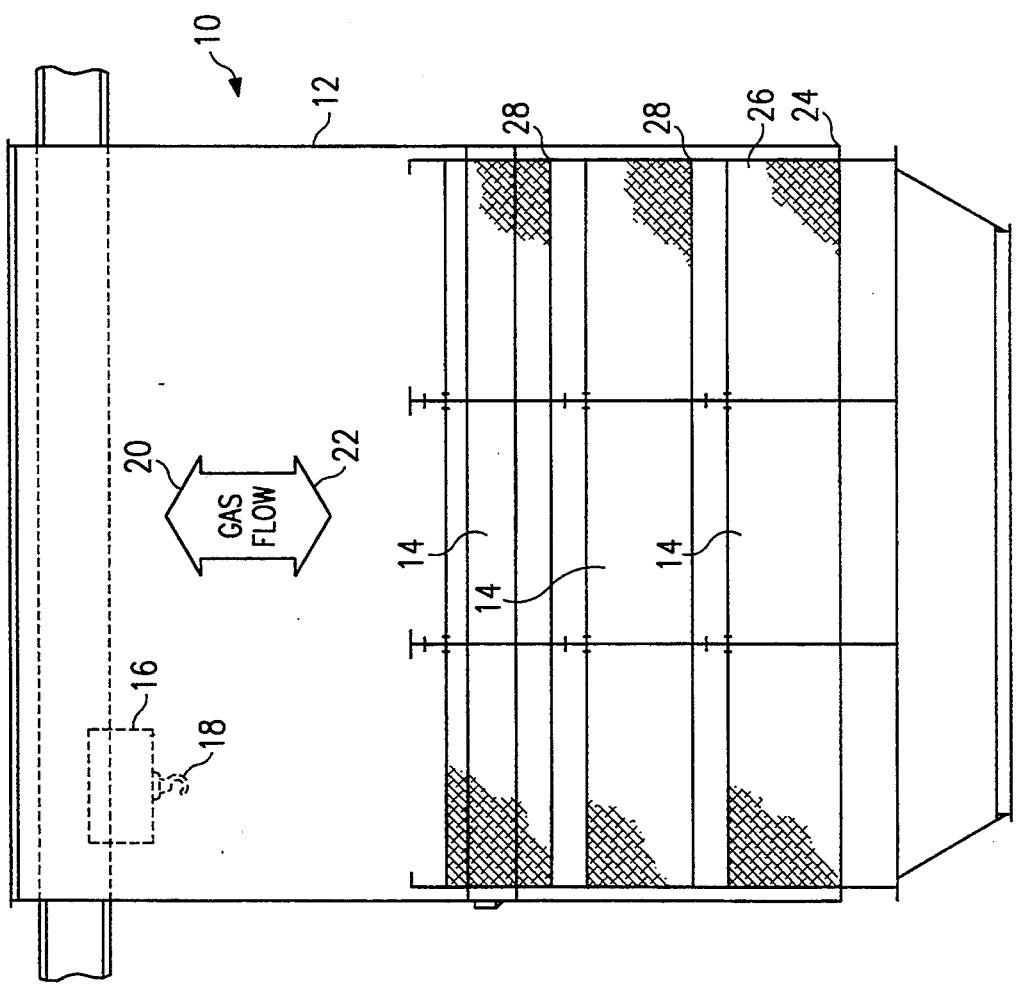
FIG. 1 is a side elevation view of a prior art SCR reactor where catalyst beds are removed vertically one by one.
Figure 6A:
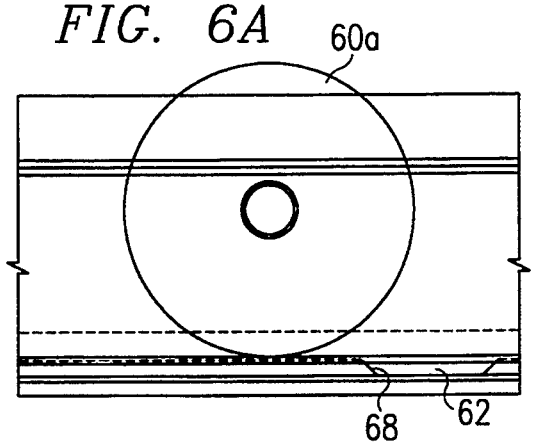
FIGS. 6A and 6B are detail views of the wheel and frame interaction as the catalyst bed moves along the frame.
Figure 6B:
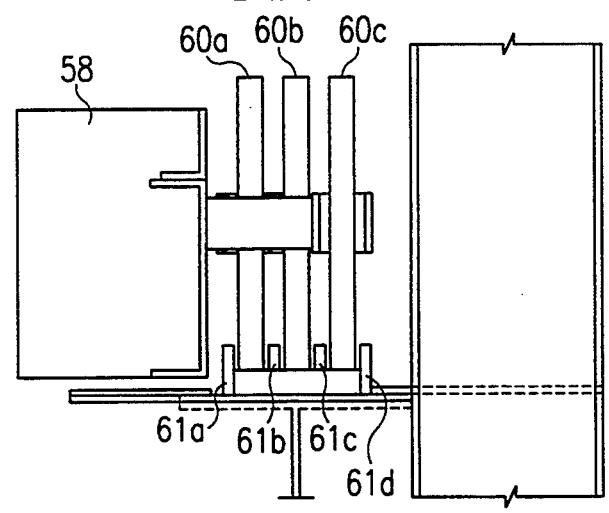

With reference now to the figures, wherein like reference numerals refer to like or corresponding parts throughout the several views, and in particular to FIGS. 1-3, an SCR reactor 10 of a known design is illustrated. The reactor 10 includes a frame 12 which supports a number of vertically stacked catalyst beds 14. Each catalyst bed lies atop the one immediately below it. Only the topmost catalyst bed is accessible for removal by the overhead crane 16 with block 18, as illustrated in FIG. 3.

As can be seen in FIG. 1, the gas flow can be in the direction of arrow 20 or arrow 22 in order to pass through each of the catalyst beds sequentially. A main seal 24 is formed between the lowermost catalyst bed 26. The beds are sealed to the bed immediately below by a similar seal 28.

The SCR reactor 10 has numerous disadvantages in actual use. The individual catalyst beds cannot be removed separately, except for the top layer. The SCR reactor itself must be taller to allow room for the hoist loading and unloading system. It is also difficult to align the catalyst beds in their vertical orientation to insure an effective seal therebetween. Finally, the catalyst loading hoist must be removed and stored when actually used, otherwise the hoist would be in the flow of gas to be treated.

Other systems have been developed which attempt to overcome the disadvantages of the SCR reactor. A rolling system with leaf spring sealing has been developed where the catalyst bed is rolled into place with permanently attached wheels and uses a leaf spring sealing device that presses against the catalyst face to form a seal. The disadvantage of this design is that it is difficult and expensive to fabricate to the required tolerance for a tight seal.

Another design is a rolling system lifted against a sealing plate. A catalyst bed is rolled into position with attached wheels and is then lifted against a seal plate where it is permanently bolted. The disadvantage of this design is the cost and storage of the lifting mechanism in addition to the time and difficulty associated with aligning the bolts and tightening of the bolts to secure the catalyst bed to the seal plate.

Another design has provided a rolling system lowered against a sealing plate. In this design, a catalyst bed is rolled into position with attached wheels. The wheels are removed, allowing the catalyst to be lowered against a seal plate. The disadvantage of this design is removal and storage of the wheels in addition to the time and difficulty associated with alignment.

Figure 7A:
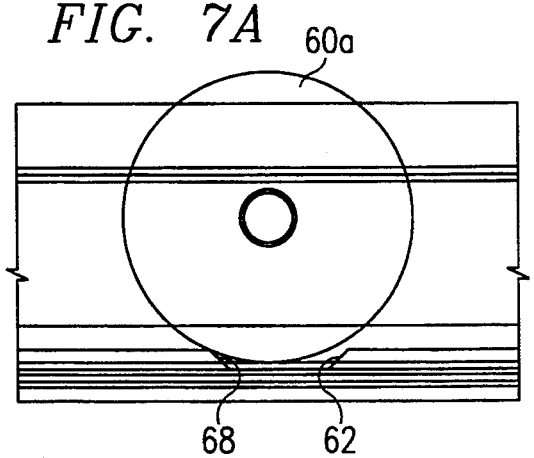
FIGS. 7A and 7B are detail views of the interaction between the wheel of the catalyst bed and the frame illustrating the gravity seal formed between the catalyst bed and the frame.
Figure 7B:
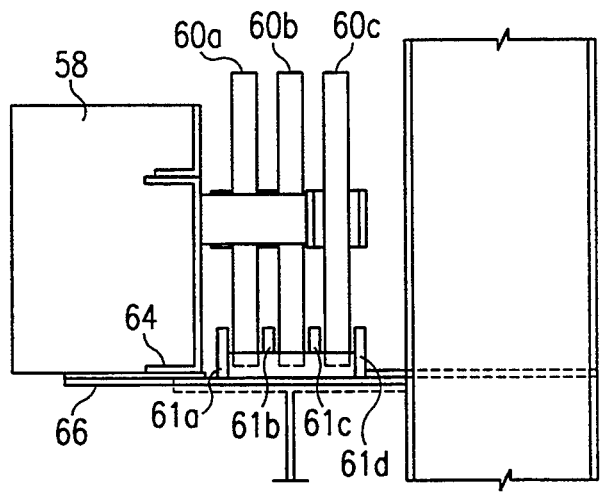

With reference now to FIGS. 4-7B, an SCR reactor 50 forming a first embodiment of the present invention is illustrated. The reactor 50 includes a frame 52 which has parallel side rails 54 and 56. A catalyst bed 58 fits into the frame 52 and has permanently mounted wheels 60A-C on either side of the catalyst bed for rolling motion along the side rails 54 and 56. The wheels are guided between guides 61A-D. The catalyst bed is inserted from a side of the frame 52 and rolled into an installed position as illustrated in FIGS. 4, and 7A and 7B. At the installed position, indentations 62 have been formed in the side rails 54 and 56 into which the wheels descend as the catalyst bed 58 is moved to the installed position. The indentations are deep enough so that a downwardly facing edge 64 on the catalyst bed 58 comes into tight engagement with sealing gasket 66 to seal the catalyst bed 58 to the frame 52. In the installed position, the wheels 60 carry little, if any, of the weight of the catalyst bed and the catalyst therein and the primary weight of the catalyst bed is supported through the sealing gasket 66 to form an effective seal.

When the catalyst bed 58 is to be removed for replacement, all that is necessary is to pull the catalyst bed 58 sideways so that the wheels 60 move up the ramp portion 68 of each of the indentations to allow the catalyst bed 58 to be removed on its wheels 60.

As can be understood with reference to FIGS. 5–7B, the wheels on each side of the catalyst bed are staggered with the width of the bed so that the wheel 60A will not be moving into an indentation designed to accept either wheel 60B or 60C before the catalyst bed moves into the installed position. Similarly, the side rails 54 and 56 are sufficiently wide to accommodate the spread of the wheels 60A, 60B and 60C and the indentations are formed only in the portions of the side rails designed to receive a specific wheel at the installed position. While this is believed to be the preferred design, the wheels can be mounted in alignment with a single side rail having three indentations so that the catalyst bed is simply removed or installed in the frame in an incremental manner with, for example, the first wheel 60A falling into each respective indentation until if finally reaches the innermost indentation representing the positioning of the catalyst bed in the installed position.

Among the advantages of the invention represented by SCR reactor 50 is the fact that the catalyst bed is self-aligning due to the interaction of the wheels and the indentations. The catalyst beds will also drop into place forming a tight gravity seal which is achieved by simply designing the wheels to fall into the indentations at the proper installed location. The ease of inserting and removing the catalyst bed provides for quick installation. Individual catalyst beds can be mounted in the SCR reactor, one above the other, which can be readily removed or replaced completely independently of the other beds within the reactor. The SCR reactor is a compact design, with no additional height required for hoisting equipment as needed in prior designs. Finally, no structures must be removed from the SCR catalyst each time the catalyst bed is installed or removed. Thus, the removal process is much simpler.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. An SCR reactor for treating a gas with a catalyst, comprising:
    a frame having side rails, gases to be treated passing through the frame;
    at least one catalyst bed having a plurality of wheels for rolling the catalyst bed along the frame between an installed position and a removal position, the catalyst bed further having a downward facing edge;
    the frame having indentations to receive the wheels of the catalyst bed in the installed position with the downward facing edge in sealing engagement with the frame, the indentations in the frame staggered across the width of the side rails to prevent engagement of any wheel in an indentation until the catalyst bed is in the installed position.

2. The SCR reactor of claim 1 further having a plurality of catalyst beds, each catalyst bed stacked vertically above another catalyst bed and each catalyst bed individually movable between the installed and removal positions independent of the other catalyst beds.

3. The SCR reactor of claim 1 wherein the catalyst bed has sides, a plurality of wheels being mounted on each side of the catalyst bed, the wheels being separated from each other in a direction perpendicular to the direction of motion of the catalyst bed in moving between the installed position and the removal position, the frame having indentations spaced apart in the perpendicular direction to receive each of the wheels in the installed position.

4. The SCR reactor of claim 1 wherein the frame has wheel guides to guide the wheels.

5. The SCR reactor of claim 1 further comprising a seal gasket positioned between the catalyst bed and the frame in the installed position forming the seal between the catalyst bed and the frame.

6. An SCR reactor for treating a gas with a catalyst, comprising:
    a frame, gases to be treated passing through the frame, said frame including parallel side rails, each of said side rails having at least two indentations therein, each side rail having a length and a width;
    a catalyst bed having a plurality of wheels for rolling the catalyst bed along the side rails between an installed position and a removal position in a first direction, the catalyst bed further having a downward facing edge;
    the length of the side rails being parallel to the first direction and the width being perpendicular to the first direction, the indentations on each of the side rails being spaced along the length of the side rails and along the width of the side rails, the indentations receiving the wheels of the catalyst bed in the installed position with the downward facing edge supporting the catalyst bed on the frame in sealing engagement with the frame, the indentations in the frame staggered across the width of the side rails to prevent engagement of any wheel in an indentation until the catalyst bed is in the installed position.

7. The SCR reactor of claim 6 wherein each of the side rails has wheel guides extending along the length of the side rails in the first direction to guide the wheels of the catalyst bed between the installed position and removal position.

8. The SCR reactor of claim 6 wherein each of the indentations includes a ramp portion to permit the catalyst bed to be removed to the removal position.

9. The SCR reactor of claim 6 wherein the catalyst bed has two sets of wheels, each set including three wheels staggered apart from one another along a direction perpendicular to the first direction.

10. A method for installing a catalyst bed in an SCR reactor for treating a gas with a catalyst, comprising the steps of:

rolling the catalyst bed on wheels mounted on the catalyst bed along side rails of the frame between a removal position and an installed position, the catalyst bed having a downward facing edge;

lowering the catalyst bed by permitting the wheels to be received in indentations in the side rails to move the downward facing edge into sealing engagement with the frames, the indentations in the frames staggered across the width of the side rails to prevent engagement of any wheel in an indentation until the catalyst bed is in the installed position.

11. The method of claim 10 further including the step of distributing the indentations in the side rails so that no wheel on the catalyst bed is received in an indentation until the catalyst bed is in the installed position.

12. The method of claim 10 further including the step of mounting a plurality of wheels on each side of the catalyst bed, the wheels being mounted in a staggered manner apart from each other in a direction perpendicular the motion of the catalyst bed.

13. The method of claim 10 further including the step of mounting ramp portions in the indentations to permit the catalyst bed to be more easily received in or removed from the indentations.

* * * * *